(12) United States Patent  
Smith et al.

(10) Patent No.: US 6,540,470 B2  
(45) Date of Patent: Apr. 1, 2003

(54) MOTORCYCLE WHEEL WASHING RAMP

(76) Inventors: Gerald F. Smith, 5084 Three Points Blvd., Mound, MN (US) 55364; Timothy R. Johnson, 2765 Halstead La., Mound, MN (US) 55364

( * ) Notice: Subject to any disclaimer, the term of this patent is extended or adjusted under 35 U.S.C. 154(b) by 0 days.

(21) Appl. No.: 09/818,488

(22) Filed: Mar. 27, 2001

(65) Prior Publication Data

US 2001/0023939 A1 Sep. 27, 2001

Related U.S. Application Data

(60) Provisional application No. 60/192,227, filed on Mar. 27, 2000.

(51) Int. Cl.[7] ................................................. A47F 5/00
(52) U.S. Cl. ........................ 414/430; 211/24; 211/20; 134/123; 193/37; 193/35 B; 15/268; 414/426
(58) Field of Search ................................ 414/426, 427, 414/428, 429, 430, 911, 433; 193/35 B, 37; 134/44, 137, 157, 123, 201; 15/268, DIG. 2; 211/20, 24, 22

(56) References Cited

U.S. PATENT DOCUMENTS

| | | | |
|---|---|---|---|
| 698,231 A | * 4/1902 | Starzman | ...................... 211/24 |
| 2,910,201 A | 10/1959 | Finn | |
| 2,910,202 A | 10/1959 | Clarke | |
| 3,009,469 A | 11/1961 | Cunningham | |
| 3,026,838 A | * 3/1962 | Sauder | ................... 414/429 X |
| 3,058,133 A | * 10/1962 | Haverberg | ................... 15/268 |
| 3,108,299 A | 10/1963 | Baldwin | |
| 3,843,000 A | 10/1974 | Bennett | |
| 3,905,597 A | 9/1975 | Tabb | |
| 4,026,546 A | 5/1977 | Omori | |
| 4,060,170 A | 11/1977 | Walters | |
| 5,069,348 A | * 12/1991 | Long | ........................... 211/24 |
| 5,165,273 A | 11/1992 | Church | |
| 5,291,696 A | 3/1994 | Enegren | |
| 5,513,938 A | 5/1996 | Chambers | |
| 5,875,878 A | * 3/1999 | Pierson | ................. 193/33 B X |
| 6,325,082 B1 | * 12/2001 | Schlueter | ................ 134/123 X |

OTHER PUBLICATIONS

Advertisement for Wheel Easy Cleaning Stamd.

* cited by examiner

Primary Examiner—Frank E. Werner
(74) Attorney, Agent, or Firm—Gerald E. Helget; Nelson R. Capes; Briggs and Morgan

(57) ABSTRACT

The motorcycle wheel washing ramp comprised of a frame including opposing sidewalls and at least one incline wall substantially perpendicular to the sidewalls. The sidewalls have opposing apertures to adjustably receive parallel aligned rollers to permit the motorcycle wheel to advance upward onto the ramp and over the two parallel rollers after which the wheel may be manually turned for washing, cleaning and/or polishing.

1 Claim, 2 Drawing Sheets

MOTORCYCLE WHEEL WASHING RAMP

This application is a continuation of a provisional application, Ser. No. 60/192,227, filed Mar. 27, 2000.

BACKGROUND OF THE INVENTION

This invention relates to a rollered ramp device that enables the cleaning and maintenance of motorcycle or vehicle wheels without raising the machine.

The cleaning of wheels on motorcycles in the past has been accomplished by way of pushing the motorcycle by hand forward or backward any number of times. This is time consuming and a hassle for the person cleaning. Hands are scraped and knuckles skinned by trying to clean as far as possible under the fender, frame, belt or chain, and mufflers. By cleaning as much of the wheel as possible, you reduce the number of times the motorcycle has to be moved.

Another method is to jack the motorcycle off the ground. However, motorcycles are heavy and often in excess of 500 pounds. This method is unsafe and time consuming. The expense of the motorcycle jack is prohibitive. This invention is inexpensive and safe to use.

Another aspect of this invention is to rotate to wheel and tire for inspection or maintenance purposes. If you have a maintenance problem with rubbing of the tire on the frame or perhaps the chain or belt hitting against the frame or swing arm, this invention allows turning of the wheel without jacking up the motorcycle. With the frame raised and the swing arm staying stationary the rubbing or hitting would not be detectable. Turning the wheel with the frame and wings arm in the riding position would allow you to detect the problems area. This invention allows you to achieve this.

There is much prior art pertaining to bicycle testing and training equipment. Applicant has not been able to find any prior art pertaining to a wheel roller used to clean wheels or for maintenance. The closest prior art is two patents, U.S. Pat. No. 3,905,597, and U.S. Pat. No. 4,026,546. Both are for bicycle peddling stands and do not achieve the same results as this invention. They both use rollers, but that is where the similarity ends. There are many patents that refer to rollers and the use of rollers, but none that refers to the use of a ramp, an adjustable roller, and a stationary roller.

This invention allows an easier and safer method for cleaning motorcycle wheels without the danger of the motorcycle falling over or falling off a jack. The ease of turning the wheel prevents the need to reach up behind the sprocket, chain, swings arm and brakes to get as much clean as possible without moving the motorcycle as many times. This prevents skinned knuckles, bruised hands and broken fingernails.

U.S. Pat. No. 2,910,201 discloses a tire changing aid having a wire frame with rollers for supporting a tire. However, the patent discloses that the wire frame flexes, which would not be suitable for supporting a motorcycle wheel attached to a motorcycle. In addition, the spacing between the rollers is not adjustable.

U.S. Pat. No. 5,165,273 discloses a tire inspection apparatus to facilitate the loading of heavy tires. The apparatus has many components, is not unitary and is very complicated. However, there is no disclosure of supporting a vehicle such as a motorcycle. Furthermore, there is no disclosure of making the device portable. The jacking apparatus disclosed would prevent the device from being made portable. Furthermore, the spacing between the rollers is not adjustable.

This invention is a simple device that could be used by thousands of motorcycle riders throughout the world. Almost every rider cleans his own motorcycle. For example, Harley Davidson, BMW, Yamaha, Honda and Kawasaki riders can use this invention to clean their wheels and tires. No more skinned knuckles and bruised hands for riders trying to clean their wheel and tires. No more jacking up a motorcycle to clean the wheels and tires. The safety issue is extremely important relating to this invention. The possibility of a motorcycle falling off the jack is highly probable and could cause serious injury or possibly death. The skinned knuckles can become infected and are painful.

SUMMARY OF THE INVENTION

The motorcycle wheel washing ramp comprised of a frame including opposing sidewalls and at least one incline wall substantially perpendicular to the sidewalls. The sidewalls have opposing apertures to adjustably receive parallel aligned rollers to permit the motorcycle wheel to advance upward onto the ramp and over the two parallel rollers after which the wheel may be manually turned for washing, cleaning and/or polishing.

A principle object and advantage of the present invention is that the motorcycle's front or rear wheel may be driven onto the ramp after which the wheel may be spun by hand to clean the hub spokes, rim and tire.

Another object and advantage of the present invention is that the motorcycle no longer needs to be consecutively moved to expose a particular portion of the wheel to be cleaned or otherwise jacked up off the ground to permit free-wheeling movement of either wheel. Another object and advantage of the principle invention is that the rollers of the ramp are adjustably movable to accommodate wheels of various diameters.

Another object and advantage of the present invention is that the unitary ramp is simple in design, inexpensive to manufacture and readily stores in a small, compact space.

DETAILED DESCRIPTION OF THE PREFERRED EMBODIMENT

Figure 1:
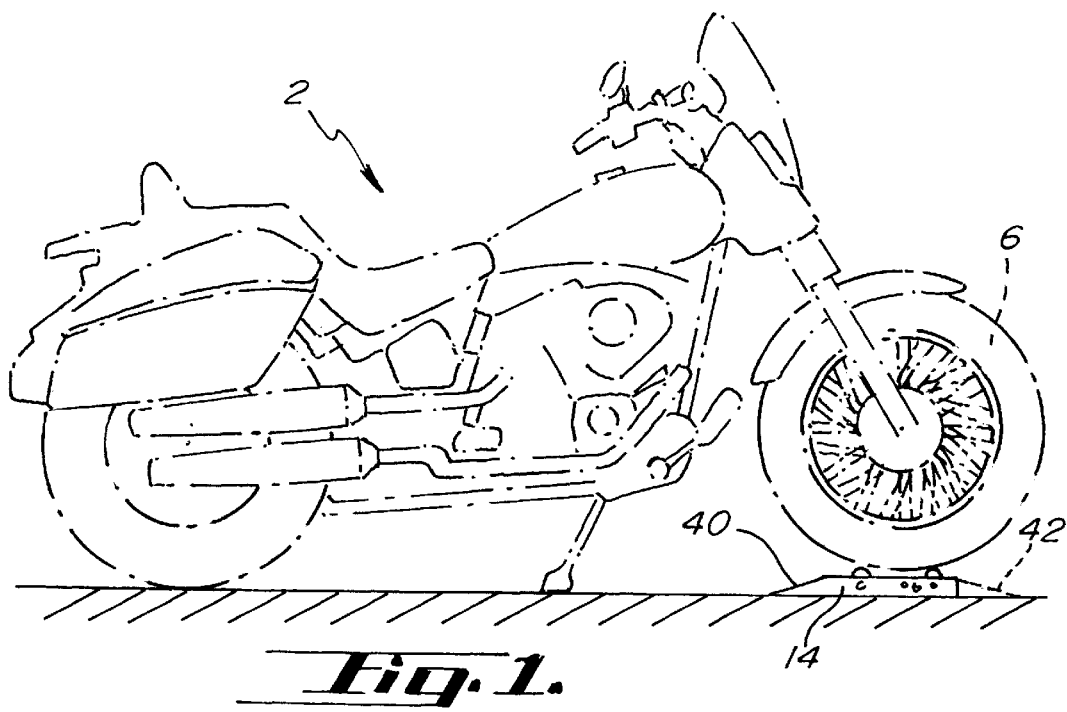
FIG. 1 is a side elevational view of the ramp sitting on the ground with a motorcycle shown in phantom outline.

Referring to FIGS. 1–4, a general appreciation of the motorcycle wheeling washing ramp 14 may be appreciated. FIG. 1 illustrates a motorcycle 2 in phantom outline with its rear wheel 4 and front wheel 6. FIG. 1 shows the ramp 14 of the present invention underneath the front wheel 6 along with the optional second incline 42 of ramp 42.

The ramp 14 generally comprises a rectangular frame including opposing sidewalls 17 and integral incline wall 40. Similarly opposing in sidewalls 17 are opposing apertures 18 (not shown), 20; 22, 23; 24, 25; and 28 (not shown), 29. The opposing apertures permit parallel rollers 34 and 35 to be mounted at their ends and supported free-wheeling by sidewall 17.

Figure 3:
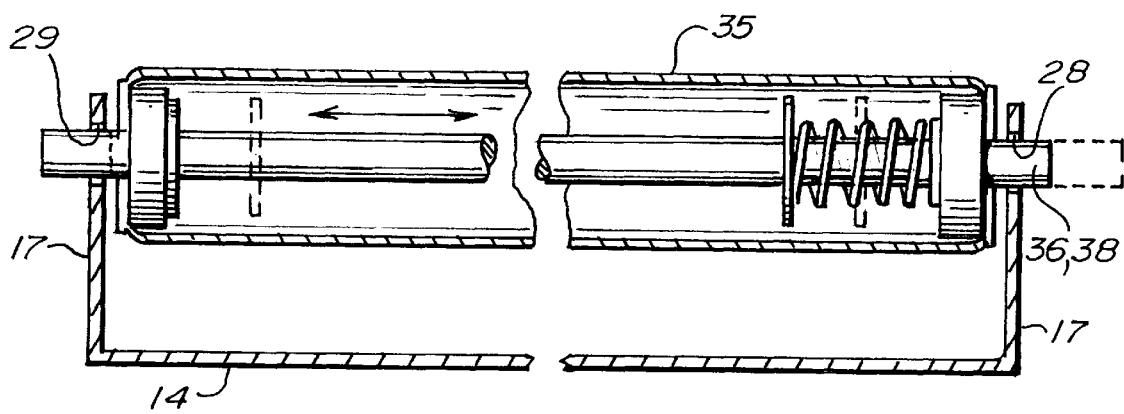
FIG. 3 is a sectional view of the roller and frame assembly partially broken away.
Figure 2:
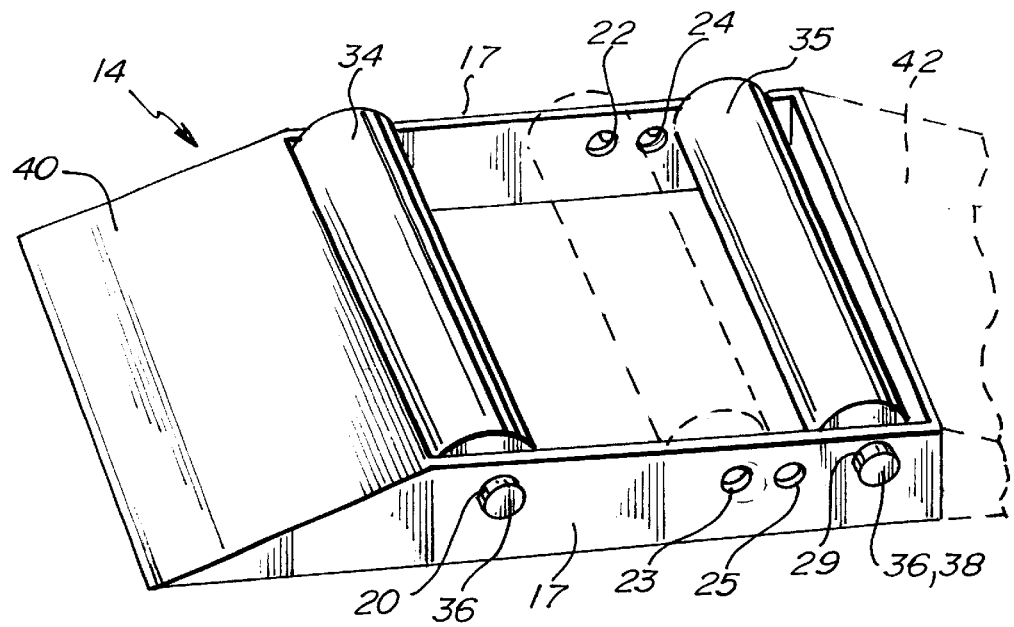
FIG. 2 is a perspective view of the ramp showing the optional adjustment of one roller and the second optional incline or ramp.

Parallel rollers 34 and 35 suitably are free-wheeling and mounted on spindles or axles 36. One end of axle 36 is retractably biased 38 as shown in FIG. 3 and is well known. Thus, the axle 36 may be moved inwardly, such as with a screwdriver (as shown by arrow A), after which the spindle 38 biases outwardly, to permit either roller 34 or 35 to be removed from the ramp 14, apertures 18, 20 or 28, 29 and remounted in apertures 22, 23 or 24, 25.

Figure 4:
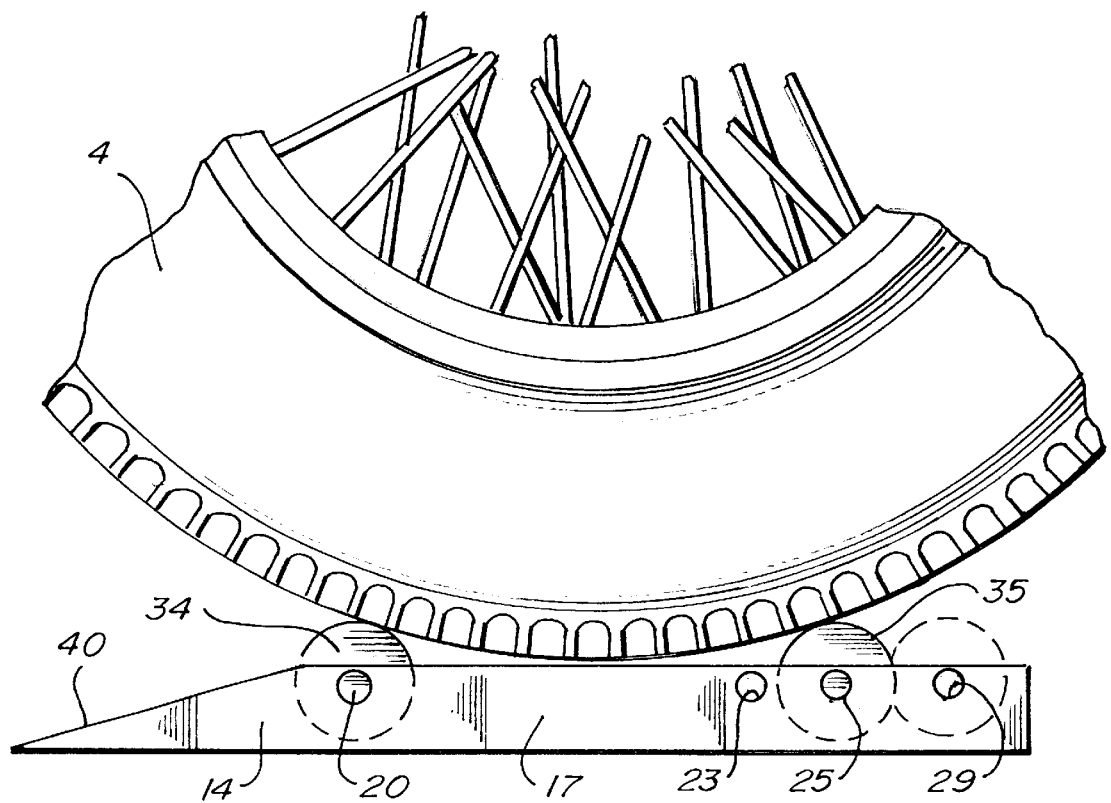
FIG. 4 is a side elevational view of the ramp with a wheel partially broken away on the ramp.

With the motorcycle wheel 4 or 6 supported on the rollers 34 and 35, the rider may simply hand turn the wheel 4 as is shown in FIG. 4 to gain access to all of the wheel hub, spokes, rim and wheel for easy cleaning while the bike remains stationary and secure. Either of wheels 4 or 6 are simply driven up on incline wall or ramp 40 to supported by rollers 34. Due to the significant weight of the motorcycle, either wheel 4 or 6 has a significant tendency to stay on top of rollers 34 and 35 to permit their rotation for cleaning. An optional second incline wall 42 may also be used in construction of the ramp 14 to permit the wheels 4 or 6 to be driven onto and off the ramp 14 in one direction.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A portable mobile motorcycle wheel washing ramp for cleaning and maintaining a motorcycle having wheels while the wheels are mounted on the motorcycle and touching the ground ramp comprising:

(a) a mobile frame having opposing sidewalls adapted to rest on the ground;

(b) an incline wall perpendicularly extending from the sidewalls to permit rolling of the wheel onto the rollers; and (c) the sidewalls having opposing mounting apertures adapted to receive two parallel rollers to support the wheel of the motorcycle while the wheel is mounted on the motorcycle wherein the rollers are attached to axles and the axles are removably mounted in the opposing apertures of the frame, the mounting apertures are spaced from one another, whereby the spacing between the rollers is adjustable, and the axles are spring-loaded for removal from and replacement in the frame.

* * * * *